(12) United States Patent
Lamparter et al.

(10) Patent No.: US 11,003,174 B2
(45) Date of Patent: May 11, 2021

(54) METHOD FOR PLANNING THE MANUFACTURE OF A PRODUCT AND PRODUCTION MODULE HAVING SELF-DESCRIPTION INFORMATION

(71) Applicant: Siemens Aktiengesellschaft, Munich (DE)

(72) Inventors: Steffen Lamparter, Feldkirchen (DE); Gisbert Lawitzky, Munich (DE); Michael Pirker, Lenggries (DE); Kai Wurm, Munich (DE); Vladimir Zahorcak, Borinka (SK)

(73) Assignee: Siemens Aktiengesellschaft, Munich (DE)

( * ) Notice: Subject to any disclaimer, the term of this patent is extended or adjusted under 35 U.S.C. 154(b) by 635 days.

(21) Appl. No.: 15/526,258

(22) PCT Filed: Nov. 13, 2014

(86) PCT No.: PCT/EP2014/074510
§ 371 (c)(1),
(2) Date: May 11, 2017

(87) PCT Pub. No.: WO2016/074730
PCT Pub. Date: May 19, 2016

(65) Prior Publication Data
US 2017/0308067 A1 Oct. 26, 2017

(51) Int. Cl.
*G05B 19/41* (2006.01)
*G05B 19/418* (2006.01)

(52) U.S. Cl.
CPC ..... *G05B 19/4188* (2013.01); *G05B 19/4183* (2013.01); *G05B 19/4187* (2013.01);
(Continued)

(58) Field of Classification Search
CPC ............ G05B 19/4188; G05B 19/4187; G05B 19/4183; G05B 19/41815;
(Continued)

(56) References Cited

U.S. PATENT DOCUMENTS 5,311,438 A * 5/1994 Sellers .................. G06Q 10/06
700/96
5,370,957 A 12/1994 Nishikiori et al.
(Continued)

FOREIGN PATENT DOCUMENTS

CA 1265355 2/1990
CN 1622103 6/2005
(Continued)

OTHER PUBLICATIONS

Elisabet Estévez, Marga Marcos and Darío Orive, "Automatic generation of PLC automation projects from component-based models", Jan. 9, 2007, Int J Adv Manuf Technol, 35:527-540, DOI 10.1007/s00170-007-1127-4. (Year: 2007).*
(Continued)

*Primary Examiner* — Mohammad Ali
*Assistant Examiner* — Kelvin Booker
(74) *Attorney, Agent, or Firm* — Cozen O'Connor

(57) ABSTRACT

A production module for performing a production function on a product, production system, production planning device, and method for planning the production of the product, wherein a plurality of production modules are intercoupled, where a self-description information set is stored within each production module as a database, e.g., NoSQL, OWL, ontology, SPARQL, which comprises properties of the production module, where if a production information set comprising the production steps required to produce the product is present, then the production information set and the self-description information sets or parts
(Continued)

thereof are transmitted to a production planning device to plan production of the product and a production procedure plan for a product to be processed is determined, and where the production procedure plan comprises an information set about a sequence of production modules of the production system, which sequence a product should pass through to produce an intermediate product or end product.

25 Claims, 6 Drawing Sheets

(52) U.S. Cl.
CPC . *G05B 19/41815* (2013.01); *G05B 19/41885* (2013.01); *G05B 2219/31052* (2013.01); *G05B 2219/31053* (2013.01); *G05B 2219/31054* (2013.01); *Y02P 90/02* (2015.11)

(58) Field of Classification Search
CPC .... G05B 19/41885; G05B 2219/31054; G05B 2219/31053; G05B 2219/31052; Y02P 90/16; Y02P 90/24; Y02P 90/20; Y02P 90/04
See application file for complete search history.

(56) References Cited

U.S. PATENT DOCUMENTS

| | | | | |
|---|---|---|---|---|
| 8,443,157 | B1* | 5/2013 | Reiner | G06F 3/0605 711/154 |
| 2004/0128176 | A1* | 7/2004 | Jordan | G06Q 10/04 705/7.22 |
| 2004/0268186 | A1 | 12/2004 | Maturana et al. | |
| 2005/0096775 | A1* | 5/2005 | Wang | G05B 19/4189 700/112 |
| 2006/0095222 | A1* | 5/2006 | Reintjes | G01D 18/008 702/106 |
| 2010/0010974 | A1* | 1/2010 | Chieu | G06F 9/5038 707/E17.005 |
| 2010/0138017 | A1* | 6/2010 | Vrba | G05B 19/4188 700/97 |
| 2011/0178622 | A1 | 7/2011 | Tuszynski | |
| 2011/0224828 | A1 | 9/2011 | Breznak et al. | |
| 2012/0253865 | A1* | 10/2012 | Narasimhamurthy | G06Q 10/0631 705/7.12 |
| 2013/0054506 | A1* | 2/2013 | Hubauer | G05B 13/0265 706/47 |
| 2013/0055115 | A1* | 2/2013 | Obitko | G05B 19/41885 715/760 |
| 2013/0094403 | A1 | 4/2013 | Park et al. | |
| 2013/0124179 | A1 | 5/2013 | Hassel et al. | |
| 2013/0129307 | A1* | 5/2013 | Choe | H04N 5/2621 386/227 |
| 2013/0179391 | A1* | 7/2013 | Fischer | G06N 5/045 706/50 |
| 2013/0211568 | A1* | 8/2013 | Chen | G05B 19/4186 700/96 |
| 2013/0226648 | A1* | 8/2013 | Horch | G06Q 10/06315 705/7.22 |
| 2013/0278964 | A1* | 10/2013 | Zeng | G06F 3/1207 358/1.15 |
| 2013/0304724 | A1* | 11/2013 | Rosjat | G06F 16/9535 707/722 |
| 2014/0143006 | A1 | 5/2014 | Chang | |
| 2014/0156615 | A1* | 6/2014 | Maier | G06F 16/21 707/694 |
| 2014/0245310 | A1 | 8/2014 | Claes | |
| 2015/0066963 | A1* | 3/2015 | Macek | G06F 17/271 707/755 |
| 2015/0178353 | A1* | 6/2015 | Hubauer | G06F 16/24568 707/771 |
| 2016/0062347 | A1* | 3/2016 | Aqlan | G05B 19/418 700/99 |
| 2016/0196131 | A1* | 7/2016 | Searle | H04L 41/082 717/173 |
| 2016/0196132 | A1* | 7/2016 | Searle | H04L 41/082 717/173 |
| 2016/0291940 | A1* | 10/2016 | Searle | H04L 41/082 |
| 2016/0291959 | A1* | 10/2016 | Searle | H04L 41/082 |
| 2016/0294605 | A1* | 10/2016 | Searle | H04L 41/082 |
| 2016/0300137 | A1* | 10/2016 | Abele | G05B 19/0428 |
| 2017/0308067 | A1* | 10/2017 | Lamparter | G05B 19/41815 |
| 2017/0316061 | A1* | 11/2017 | Hubauer | G05B 19/054 |
| 2017/0322542 | A1* | 11/2017 | Zahorcak | G05B 19/0426 |

FOREIGN PATENT DOCUMENTS

| | | |
|---|---|---|
| CN | 103034313 | 4/2013 |
| DE | 10352376 A1 | 6/2005 |
| DE | 102010036206 | 3/2012 |
| DE | 102013104354 A1 | 5/2014 |
| EP | 2772856 A1 | 9/2014 |
| JP | H 06-3851 | 1/1994 |
| JP | H 08-187648 | 7/1996 |
| JP | 2002-032434 | 1/2002 |
| JP | 2006-099739 | 4/2006 |
| JP | 2006195735 A | 7/2006 |
| JP | 2007-172286 | 7/2007 |
| KR | 20130042446 | 4/2013 |
| RU | 2321886 C2 | 4/2008 |
| RU | 90588 U1 | 1/2010 |
| TW | 201421409 | 6/2014 |
| WO | WO 2006075655 A1 | 7/2006 |
| WO | WO 2012/028414 | 3/2012 |
| WO | WO 2013/173508 | 11/2013 |

OTHER PUBLICATIONS

Sergii Iarovyi, Wael M. Mohammed, Andrei Lobov, Borja Ramis Ferrer, and Jose L. Martinez Lastra, "Cyber—Physical Systems for Open-Knowledge-Driven Manufacturing Execution Systems", May 2016, Proceedings of the IEEE | vol. 104, No. 5. (Year: 2016).*
Michael P. Papazoglou and Willem-Jan van den Heuvel, "A Reference Architecture and Knowledge-Based Structures for Smart Manufacturing Networks", Aug. 11, 2015, IEEE Software. (Year: 2015).*
Vrba et al., "Semantic technologies: Latest advances in agent-based manufacturing control systems", Mar. 2011, International Journal of Production Research. (Year: 2011).*
Lorenz et al., "REWERSE, Reasoning on the Web with Rules and Semantics, A1-D4 Ontology of Transportation Networks", Aug. 2005, IST506779/Munich/A1-D4/D/PU/a1. (Year: 2005).*
Papailiou et al., "H2RDF: Adaptive Query Processing on RDF Data in the Cloud", Apr. 2012, WWW 2012 Companion, 2012, Lyon, France, ACM 978-1-4503-1230—Jan. 12, 2004. (Year: 2012).*
Hubauer et al., "Automata-Based Abduction for Tractable Diagnosis", 2010, Proc. 23rd Int. Workshop on Description Logics (DL2010), CEUR-WS 573, Waterloo, Canada. (Year: 2010).*
Office Action dated Aug. 7, 2018 issued in the corresponding Japanese Patent Application No. 2017-525876.
Office Action dated Nov. 2, 2018 issued in Chinese Patent Application No. 201480082898.X.
Office Action dated Nov. 21, 2018 issued in Korean Patent Application No. 10-2017-7016196.
Office Action dated Apr. 24, 2019 issued in Japanese Patent Application No. 2017-525876.
Office Action dated Dec. 24, 2019 issued in Japanese Patent Application No. 2017-525876.

* cited by examiner

METHOD FOR PLANNING THE MANUFACTURE OF A PRODUCT AND PRODUCTION MODULE HAVING SELF-DESCRIPTION INFORMATION

CROSS-REFERENCE TO RELATED APPLICATIONS

This is a U.S. national stage of application No. PCT/EP2014/074510 filed 13 Nov. 2014.

BACKGROUND OF THE INVENTION

1. Field of the Invention

The present invention relates to a production module for performing a production function on a product, where the production module is configured to couple to a second production module that is configured to perform a second production function on the product.

2. Description of the Related Art

In general, production modules are known. As such, the published specification US 2011/0224828 A1, for example, discloses a system for developing robots and other "cyber-physical systems" (CPS). The system comprises a platform that allows the actuation of actuators and sensors and other modules. Various modules are disclosed that are usable for particular tasks known in robotics. These tasks may be the drive for motors or the reading and actuation of sensors, for example. The modules communicate with one another and with further devices, such as computers and user-created modules, for example, using a standard communication protocol.

A disadvantage of the prior art is that the design and setup of such a system can be really complex and/or that a relatively large amount of collaboration by a user is required to create and set up such a production system.

SUMMARY OF THE INVENTION

In view of the foregoing, it is therefore an object of the present invention to simplify the configuration and/or operation of a modular production system.

This and other objects are achieved in accordance with the invention by a production module which is configured to perform a production function on a product and to couple to a second production module. Here, the second production module is additionally configured to perform a second production function on the product. The production module comprises a memory device that stores a piece of self-description information regarding properties of the production module. The production module may alternatively also be configured to store a piece of self-description information regarding the properties of the production module in the memory device. The production module is additionally configured to transmit the piece of self-description information, or portions of the piece of self-description information, to a further device. Here, the piece of self-description information is stored or storable as what is known as a NoSQL database or a nonrelational database. Alternatively, the production module may also be configured to store the piece of self-description information as a NoSQL database or nonrelational database. In particular, the piece of self-description information may be stored or storable as an OWL or RDF database and/or a database using SPARQL as query language. The production module may alternatively also be configured to store the piece of self-description information in the cited formats.

The use of the NoSQL database technique or the use of what are known as nonrelational databases allows very complex concatenations of terms and data to be achieved in a comparatively simple manner. The setup of a production system with the aforementioned production modules requires the demands on the manufacture of a product to be brought into line with the capabilities and properties of the production modules. As a result, the setup or the design of such a production system makes it easier for the use of the NoSQL databases or nonrelational databases to allow logical strings of terms of this kind, which are sometimes really complex, to be simpler. As such, e.g., concatenating terms and/or data regarding a manufacturing process or method for the product with information stored in the piece of self-description information, for example, about the production functions or other services, can thus implement properties, parameters etc. of the production module in a comparatively simple manner. Therefore, it is then possible to simplify a production system consisting of such production modules using such NoSQL databases or nonrelational databases. By way of example, this simplification can consist of requiring less user action or facilitating the configuration of such a production system for a user, such as via intelligent proposals.

Production modules may be a wide variety of mechanical, electromechanical or electronic devices that are set up and designed for treating, moving, processing and/or conditioning an item, a workpiece, a liquid or comparable products, assemblies or materials. Production modules may be tool modules, machine tools (e.g., for milling, drilling, punching, pressing or the like) or similar tools, equipment or machines or elements, for example. Additionally, production modules may also be configured to at least, inter alia, transport products, assemblies or materials, such as as a conveyor belt, crane, robot arm, or pump. Additionally, production modules may also be configured to store or supply appropriate products (e.g., comprising a shelf system, or tank). The production module may also be configured, by way of example, to heat or otherwise condition workpieces, assemblies and/or solid, liquid or gaseous materials, such as a furnace, kettle, valve, or stirrer.

The production module itself may in turn be constructed from multiple parts, assemblies and/or submodules and/or, by way of example, may have one or more mechanical and/or electronic subunits.

A production module may be a control unit or a controller configured to control the production function and/or the methods, processes and investigations described in the present invention with reference to the production module, for example. Additionally, the production module may comprise one or more communication interfaces and also one or more memory devices for storing data and/or information. To perform the production function, the production module may also comprise appropriate mechanical, electrical, electronic and/or electromechanical or optical components.

In particular, the production module may be configured as what is known as a "cyber-physical system" (CPS) or part thereof. As such, the production module may be in the form of and configured as what is known as a "cyber-physical module" (CPM) or a "cyber-physical production module" (CPPM), for example.

A product may be configured as a mechanical, optical, electromechanical, electronic or comparable product or assembly, for example, or may comprise such products or assemblies. Additionally, the product may comprise a workpiece, an assembly, a solid, liquid or gaseous material, a solid, liquid or gaseous chemical, for example. The product may also be any type of intermediate product or the end product of a particular production process, for example. End products may be all types of products that are sold commercially, such as a microchip, a computer, a camera, a car, a chemical, a substance, etc., or any types of intermediate products for such products.

In the present invention, the term "product" is used as an abstract description of an item that is by all means variable in production or conditioning. A "product" as defined in the present invention can by all means vary in its outer or inner appearance or embodiment in the course of a production process, for example, as a result of the action of production functions.

A production function is understood in the present invention to mean generally any process that is performed or can be performed in the production, manufacture, processing, treatment or conditioning of an item, a material or a substance. A production function may in this case be, e.g., any possible work step for an arbitrary product from the initial materials to the finished end product.

By way of example, a production function can comprise any type of material conditioning (e.g., milling, drilling, grinding, pressing, painting, casting, pumping, heating, moving, opening, or closing,), any type of transport or movement or handling of an item, of an assembly, of a material or of a substance, or processes of this kind. Additionally, the production function may be, by way of example, storage, diagnosis, checking, optical recording, measurement, determination of a shape, situation or size or comparable functionalities, or may comprise such functionalities.

The coupling of the production module to the second production module may be configured such that the production function of the production module and the second production function of the second production module can interact or such that they do interact. Such interaction of production functions may be joint conditioning of a product, conditioning and transport of a product or transfer of a product from one transport unit to another, for example. To this end, two production modules may be in a suitable geometric arrangement, for example, and coupled, e.g., electronically such that the interaction of the production functions is made possible or is performed or is performable.

The coupling of the production module to the second production module may be configured as a communicative coupling, for example, via appropriate wired or wireless communication interfaces (e.g., via Ethernet, Profinet, Profibus, field buses, WLAN, Bluetooth, or NFC) or may comprise communicative coupling of this kind.

Additionally, the coupling of the production modules may also comprise a mechanical coupling, e.g., via appropriate connecting elements. For a mechanical coupling of this kind, a production module can have or can comprise appropriate connecting elements, sensors and/or actuators, for example.

The second production module may be configured in accordance with the production module or first production module described in the present invention, for example. Additionally, the production modules may each be coupled to further production modules that in turn may each be configured in accordance with a production module or a first production module in accordance with the present invention. Here, the coupling to the respective other production modules may also be configured as explained in more detail in the present invention.

The piece of self-description information regarding properties of the production module can comprise a wide variety of information regarding the production function of the production module, for example. In particular, the production function can comprise an identifier or characterisation of the functionality or functionalities that is or are implemented in the production function, for example. Additionally, it can comprise information about conditionable or processable materials or items, information about size stipulations, shape stipulations, weight stipulations or similar stipulations or prerequisites, information about one or more conditioning areas of the production module, information about quality criteria or results and/or prerequisites regarding the production function or the relevant work result or product or similar information regarding the production function.

The piece of self-description information can also comprise information about other properties of the production module, such as a size, a geometry, a situation, an identification identifier, a design, a configuration, available services and functionalities, connected equipment, modules and/or assemblies, available control commands and other commands and also available communication interfaces, applicable communication parameters (e.g., MAC address) and/or a piece of state information regarding the production module.

The piece of self-description information regarding properties of the second production module and also regarding further production modules cited in the present invention may be configured in accordance with the statements above.

The transmission of the piece of self-description information between the production modules can occur or may be configured as wired and/or wireless communication, for example. Such a transmission can occur or may be configured via Ethernet, field buses, WLAN, Bluetooth, NFC, optically or the like, for example. For the coupling of the second production module to the first, there may be provision for the second piece of self-description information of the second production module to be sent to the production module, for example. Additionally, the piece of self-description information of the production module can also be sent to the second production module. There may also be provision for an interchange of the self-description information between the production module and the second production module.

The further device to which the piece of self-description information is transmittable or is transmitted from the production module may be any electronic device that is configured to communicate with the production module and to receive the piece of self-description information from the production module. Such devices may comprise a production module in accordance with the present invention, such as a "cyber-physical production module" (CPPM), a computer, a server, a controller, a programmable logic controller, an automation device or an automation module.

A database is understood in the present invention to mean any structured accumulation of data that is managed in a predetermined manner. Here, the approach for managing the data may be document-oriented, graph-oriented, object-oriented, attribute-value-pair-oriented and/or column-oriented, for example, or can be effected in accordance with a relational data model.

In this case, a nonrelational database is understood to mean one that uses a data model other than a relational data model for management.

In contrast to established relational databases (e.g. SQL databases), "NoSQL" (Not only SQL) databases denotes a nonrelational approach. NoSQL databases are understood in conjunction with the present invention and the claims to mean databases that pursue the aforementioned nonrelational approach. In particular, NoSQL databases are understood in the present invention and claims to mean document-oriented, graph-oriented, object-oriented, attribute-value-pair-oriented and/or column-oriented databases. Such NoSQL data memories normally require no defined table schemes and attempt to avoid what are known as "joins".

Up-to-date NoSQL databases normally dispense with rigid schemes for the tables, such as their relational counterparts have. As scheme-free databases, they rely on more flexible techniques to stipulate how data are stored. Alternatively, the storage mode can also be left to the applications. The name NoSQL can be attributed to the use of protocols other than the SQL protocol for communication with the clients.

A NoSQL database in conjunction with the present invention may be set up as and in the form of, e.g., a document-oriented database, a graph-oriented database, a distributed ACID database, a key value database, an attribute-value-pair-oriented database, a multi-value database, an object-oriented database and/or as a column-oriented database or a combination or further development of such databases.

An OWL database is understood to mean a database that uses what is known as the "Web Ontology Language" standardised by what is known as the "World Wide Web" Consortium (W3C).

An RDF database is understood to mean a database that uses the "Resource Description Framework", likewise standardised by the "World Wide Web" Consortium (W3C).

The query language SPARQL is a graph-based query language for the "Resource Description Framework" (RDF). The name is an acronym for "SPARQL Protocol And RDF Query Language". SPARQL was released by the "World Wide Web" Consortium (W3C) for the first time in 2008 as a recommendation.

Additionally, the production module for storing the piece of self-description information may be configured as a NoSQL database, a nonrelational database, an OWL database, an RDF database and/or a database using SPARQL as query language.

In an advantageous embodiment, the piece of self-description information comprises, by way of example, a piece of service information regarding the production function, a piece of configuration information regarding a situation and/or embodiment of the production module, a piece of capability information regarding available functions and services of the production module, which piece of capability information comprises a piece of information about the production functions, a piece of instruction information regarding instructions executable by the production module and adjustable parameters and/or a piece of state information regarding a work state of the production module.

Additionally, the piece of self-description information stored in the production module in accordance with the present invention can comprise a piece of configuration information regarding a situation and/or embodiment of the production module.

The piece of self-description information can also comprise a piece of capability information regarding available functions and services of the production module, where piece of capability information can comprise a piece of information about the production function, for example.

Additionally, the piece of self-description information can also comprise a piece of instruction information regarding instructions executable or understandable by the production module and adjustable or adjusted parameters.

Also, the piece of self-description information can also comprise a piece of state information regarding a work state. In this case, a work state can comprise a current operating state (fully functionally active, partly functionally active, inactive, or emergency mode) or information regarding faults and warnings that have occurred, or the like. The piece of state information can additionally comprise a piece of information about a product present in or on the production module (e.g., an applicable product ID, a current conditioning state, or a current position within the production modules).

The piece of configuration information of the production module can comprise a position, a functional embodiment and/or a geometric embodiment of the production module, for example. Additionally, the piece of configuration information of the production module can also comprise an available and/or accessible spatial work area or a physical and other environment (e.g., adjacent modules, machines, or safety areas).

The second production module couplable or coupled to the production module can comprise a second piece of self-description information regarding properties of the second production module, where the production module is additionally configured to transmit the self-description information, or portions of the self-description information, to the second production module and to receive the second piece of self-description information, or portions of the second piece of self-description information, from the second production module.

In this case, the second piece of self-description information may be stored or is storable in the second production module likewise as a NoSQL database, nonrelational database, OWL database, RDF database and/or a database using SPARQL as query language. Alternatively, the second production module may also be configured to store the second piece of self-description information as a NoSQL database, nonrelational database, OWL database, RDF database and/or a database using SPARQL as query language.

The content of the piece of self-description information regarding the properties of the second production module may be configured in accordance with the piece of self-description information regarding the properties of the production module, for example. The transmission of the piece of self-description information or of the second piece of self-description information between the first and second production modules can occur, for example, as a wired and/or wireless communication, for example via Ethernet, field buses, WLAN, Bluetooth, NFC, or optically.

The piece of self-description information of the production module can additionally comprise a piece of port information regarding the coupling to the second production module.

This simplifies the configuration and also the operation of a production system using such production modules by virtue of a production module already containing information regarding a coupling to an adjacent production module and hence, by way of example, properties of the second or of further production modules already being accessible in a relatively simple manner for the work or for applicable planning by the production module.

The piece of port information regarding the coupling to the second production module can comprise a piece of information about the second production function of the second production module or about further production functions and/or production services of the second production module, for example. Additionally, the piece of port information regarding the coupling to the second production module can comprise portions or all of the second piece of self-description information of the second production module or can comprise information that has been ascertained from portions or all of the second piece of self-description information of the second production module.

Additionally, the piece of port information regarding the coupling to the second production module can comprise a piece of information about a spatial interaction area of the production module with the second production module. In this case, the spatial interaction area may be provided and formed as a spatial area such that when there is a product in the spatial interaction area both the production function of the production module and the second production function of the second production module can influence a product, for example.

As such, when there are two modules that both have a transport functionality, for example, an interaction area may be, by way of example, an area in which a transfer from one transport medium to the other can occur or does occur, for example. If both modules are provided with a conditioning functionality, for example, then the interaction area may be, by way of example, an area in which both one and the other conditioning functionality can influence the product. If one of the modules has a conditioning functionality, for example, while the second module has a transport functionality, for example, then an interaction area may be, by way of example, an area in which the transport module must or can position a product so that it is conditionable, or is conditioned, by the other module.

The ascertainment and/or storage of the piece of port information regarding the coupling to the second production module can be initiated by a user, for example. Additionally, the piece of port information can also be ascertained and/or stored automatically as part of a coupling to the second production module. Additionally, the piece of port information regarding the coupling to the second production module can also be stored when a change in the state or the properties of the second production module has occurred, for example, and the second production module then communicates the updated piece of state or property information to the production module.

The production module can also comprise a further piece of port information regarding the coupling to a further production module if there is provision for, or there is, a coupling to the further production module in accordance with the present invention. By way of example, a piece of port information in accordance with the present invention may be provided or stored for each production module directly coupled to the production module.

The piece of port information regarding the coupling to the second production module can additionally comprise information regarding properties of further production modules directly and/or indirectly connected to the second production module. In particular, the piece of port information regarding the coupling to the second production module can comprise information regarding production functions of the function modules directly and/or indirectly connected to the second production module.

This simplifies the configuration and/or operation of a production system comprising such a production module, because the production module already contains information about what functionalities or modules are attainable via a particular coupling to a particular further module. In this way, the setup and operation of such a production system can be simplified for the user, for example, by virtue of only simpler, fewer or no work steps by a user now being necessary during setup, for example. The configuration of such a system can also be facilitated for a user in this way.

The piece of port information regarding the coupling to the second production module can, in this case, comprise information regarding properties or production functions of all further production modules directly and/or indirectly connected to the second production module.

Here, one production module is directly connected to another when a coupling in accordance with the present invention is provided or set up between the two modules and/or the modules are directly adjacent. Two modules may be directly connected when they are formed, coupled and in a geometric situation relative to one another such that with suitable positioning of a product this product has access to production functions of both modules, for example.

Two production modules are indirectly connected when there is no direct coupling between these modules, but rather coupling is effected via one or more interposed modules.

The second piece of self-description information of the second production module can comprise a corresponding piece of port information regarding the coupling to the production module, which coupling may be configured analogously to the above details and embodiments regarding the piece of port information.

The production module may additionally be configured to communicate with a product data processing device associated with a product to be conditioned and/or for receiving a piece of production information regarding manufacture of an intermediate product or end product.

This facilitates the configuration and/or operation of a production system comprising such a production module by virtue of the production module having not only its own properties and possibly also those of further modules available in it but also, via such an embodiment, information about production steps to be performed using the module or the production system.

In this way, it is possible for planning for production, for example, to be facilitated for a user, or for this to become semi-automated or fully automated by virtue of the demands that result from the piece of production information for the production of the intermediate product or end product being able to be collated with the functionalities of the production module and possibly with these coupled modules. In this connection, storage of the self-description information as a nonrelational database or NoSQL database is very advantageous, because this allows even collation of more complex terminology and logical relationships to be performed in a simpler manner.

The product data processing device may, by way of example, be configured such that it is or may be permanently connected to or associated with the product such as during a manufacturing process related to the product. In this case, the product data processing device can comprise an applicable controller, an applicable memory and/or an applicable communication device for communication with the production module, for example.

The product data processing device may, by way of example, also be mechanically associated with the product, such as fitted to the product, or to a support, holder for the product or the like. The communication device may be configured to communicate via RFID, Bluetooth or WLAN, for example, because this allows communication to be accomplished in a simple manner when a product is moving via different modules. The product data processing device can also consist of multiple components, one of which, by way of example, is associated with the product in the aforementioned way, while a second portion can be installed on an external computer, another module or the like, for example. In this way, the portion directly associated with the product could comprise a product identification identifier and communicate, for example, while applicable production information is then stored in the external system, for example, and transmittable to the production module using a separate communication.

The piece of production information can be received from the product data processing device directly, for example, or from another computer or controller, e.g., from a manufacturing execution system (MES), an enterprise resource planning (ERP) or a similar system.

The piece of production information can comprise or consist of the work steps necessary, required or proposed for manufacturing the intermediate product or end product and/or information in this regard. Such work steps, or information in this regard, may be geometric embodiments to be manufactured by mechanical conditioning (e.g., milling, drilling, or pressing), movements of actuators (e.g., movement of motors, or pumps or valves), temperature and/or pressure profiles to be implemented, information regarding printing or painting, information regarding the setup of connections between parts, product parts or assemblies or similar work steps and information in this regard, for example.

In particular, the piece of production information can contain all work steps and information in this regard that is/are necessary or planned for the manufacture of the intermediate product or end product from a prescribed starting product.

The details, data and/or elements regarding the manufacture of the intermediate product or end product that are contained in the piece of production information may be stored or embodied in a product-related language, formulation or embodiment or in an abstract, more general formulation or representation of work steps or information in this regard, for example.

Additionally, the production module may be configured to for store a piece of module planning information. The production module may also be configured to output a piece of information regarding the piece of module planning information.

The piece of module planning information can particularly comprise or consist of information about functionalities to be implemented by the production module on the product. Such information may be, for example, details about a product to be conditioned, such as a product ID, a name, an identifier, or a type. Additionally, such information can comprise one or more production functions or services to be performed on this product. Also, the piece of planning information can comprise or have applicable production or service data pertaining to the production functions, such as CAD data, settings, temperatures, temperature profiles, or required quality. Additionally, the piece of module planning information can also comprise or have information about a time, a timeslot and/or a time period, for the conditioning of a product by the production module.

The piece of module planning information can thus comprise or consist of, by way of example, that piece of information that is or may be necessary, required and/or useful for the production module for conditioning of the product by the production module.

In this case, the piece of module planning information may be stored in the production module. Additionally, the production module may also be configured to receive the piece of module planning information from a further data processing device, such as a computer, server, or further production module or the like.

The output of a piece of information regarding the piece of module planning information may comprise output of a piece of information about production steps currently planned using the module, available time slots or the output of the complete piece of module planning information to an applicable system, for example.

It is also an object of the invention to provide a production system for manufacturing an intermediate product or end product, where the production system comprises a plurality of production modules coupled according to the present invention, and where each of the plurality of production modules is or is additionally able to be configured in accordance with the present invention.

In this case, the production system may be an overall installation or an overall system for manufacturing an intermediate product or end product or may be a subsystem of such an overall system or such an overall installation, for example.

An end product is generally understood to mean a product obtained as the result of a production installation. This may be a marketable, storable or transportable product or material, for example. This can be marketed to an end customer or to a further-processor or conditioned further within an installation, for example. An end product can also be or comprise a plurality of pieces, an amount of material or an amount of substance or an accumulation.

A production system can comprise at least two production modules in accordance with the present invention, and advantageously at least three to ten modules in accordance with the present invention, for example.

It is also an object of the invention to provide a production system for manufacturing an intermediate product or end product, comprising a plurality of production modules, where each of the plurality of production modules is configured to couple to at least one respective further production module of the plurality of production modules, and where a respective memory device in each of the production modules stores a piece of self-description information regarding properties of the relevant production module, and where each of the production modules is configured to transmit the respective piece of self-description information or portions of the respective piece of self-description information to a further device.

In this case, there is additionally provision for at least some of the plurality of production modules in accordance with the present invention to be coupled among one another, and for the production system to comprise a term transfer module, where the term transfer module is configured to associate elements of a piece of production information regarding the manufacture of the intermediate product or end product and elements of the piece of self-description information of the production modules.

Such a production system allows a simpler design, simpler setup or simpler operation by virtue of firstly self-description information being provided in the individual production modules, for example, which information can be used to simplify, semi-automate or even automate the configuration and operation of such a production system. The availability of such information can be used to collate capabilities of the various modules with an applicable piece of production information, such as a "production guide" for a product.

Additionally advantageous is the use of the term transfer module in this connection, where the term transfer module is able to be configure to perform such association.

In this case, the term transfer module may be configured as explained in more detail at another juncture in the present invention. In particular, the term transfer module may, for the association of elements of the piece of production information and the elements of the self-description information, be configured to access one or more NoSQL databases or nonrelational databases, in particular may comprise one or more such databases. Additionally, there may be provision for the term transfer module to be configured to use or access an OWL or RDF database. Also, there may be provision for the term transfer module to be configured to use SPARQL as the query language for the association of terms of the piece of production information and of the piece of self-description information.

In this case, the term transfer module may be configured as a software application having an associated piece of hardware for executing the applications, for example, where the hardware can also be used or may also be usable by further software applications.

The term transfer module may comprise a separate unit within the production system, such as part of an applicable computer unit. The term transfer module may also be part of a production module, of multiple instances of the production modules or of all production modules of the production system.

Additionally, the production modules, the piece of self-description information regarding properties of a production module, the transmission of the piece of self-description information, the further device, the production modules and the production system may additionally be further configured in accordance with the present invention.

It is also an object of the invention to provide a production planning device for planning manufacture of an intermediate product or end product using a production system in accordance with the present invention, where the production planning device is configured to store a piece of production information and where the piece of production information comprises production steps required for manufacturing the intermediate product or end product. Here, the production planning device is configured to receive and store at least portions of the self-description information of a selection of production modules of the production system. In addition, the production planning device is configured to ascertain a production flowchart for a product to be conditioned, where the production flowchart comprises a piece of information about an order of production modules of the production system through which a product is intended to or is able to or does pass for the manufacture of the intermediate product or end product.

A production planning device of this kind can be used to further simplify the configuration and also the operation of an applicable production system by virtue of it being possible, via the access to self-description information of production modules, to use a production plan, created for a product, with reduced or even no user action to create a flowchart for the manufacture of the product using the production system.

Particularly the collation of terms from the piece of self-description information, i.e., by way of example, the capabilities of the production modules, with the demands on the product manufacture from the piece of production information can advantageously be achieved, by way of example, with self-description information of the production modules that is stored as a NoSQL database or as a nonrelational database.

Self-description information stored in such a way allows more complex logic functions, which result from the different terminologies of the production information and self-description information, for example, to be handled. As such, the cited databases can be used to implement what are known as "ontologies", for example, in terms of data processing. Such ontologies can be used to logically combine, e.g., the terminologies of the piece of production information for product manufacture and the self-description information of the production modules.

A production planning device may comprise a software application having an appropriate piece of execution hardware, for example. In this case, there may be provision for the execution hardware to be used, e.g., also by further software applications, operating systems or similar software elements. The production planning device may be implemented within applicable electronics associated with the product, for example.

It may also be realised inside an external computer, for example, or realised inside a production module of the production system, inside multiple production modules of the production system or inside all production modules of the production system.

In this case, there may be provision for the piece of production information to be stored in the production planning device. Additionally, the production planning device may be configured to receive the piece of production information from a further unit. External units of this kind may comprise a memory or data processing unit associated with the product, for example, a further production module or, by way of example, an external computer, such as a planning system (e.g., an MES or an ERP).

The piece of production information with the production steps contained therein that are required for manufacturing the intermediate product or end product may be configured as described in more detail in the present invention at another juncture. In this case, the piece of production information does not have to comprise all of the production steps that are necessary for manufacturing the intermediate product or end product. As such, it is also possible for production steps to occur outside the production system, for example, in the manufacture of the intermediate product or end product.

As already mentioned at other junctures in the present invention, production steps may be any type of conditioning, treatment and/or transport processes, for example.

The production planning device is configured to receive and store at least portions of the piece of self-description information at least of a selection of production modules of the production system. Here, the portions of the piece of self-description information may be all of the piece of self-description information stored in the respective production module, for example. Additionally, they may particularly be portions of the self-description information of the respective production modules, e.g., such as portions that relate particularly to one, multiple or all production functions and/or production services of the respective production module.

The selection of production modules may be all of the production modules of the production system, a subset of the production modules of the production system or just one production module of the production system, for example. As such, there may be provision, by way of example, that when the production planning device is implemented in one production module, at least those portions of the self-description information of the other production modules of the production system that relate to the respective production functions of the production modules are transmitted to the production module and stored therein. The separate piece of self-description information stored in the production module itself means that the production planning device then has, e.g., all of the self-description information relating to the production functions of the production system available. This information and that from the piece of production information can then advantageously be used to ascertain a production flowchart in accordance with the present invention.

Following ascertainment of the production flowchart, the flowchart can be stored in the production planning device, for example. Additionally, the production flowchart can also be transmitted to one, multiple or all production modules of the production system. Additionally, the production flowchart can also be transmitted to, and possibly stored in, a data processing device associated with a product, for example.

The production flowchart can be ascertained, by way of example, by virtue of each production step contained in the piece of production information being associated with one or more production functions of the production system, such as via an appropriate database structure, or an appropriate ontology database. As such, by way of example, the production step to be performed that is provided may be the manufacture of a certain outer geometric shape for a workpiece, including, e.g., appropriate CAD data, while there is a milling machine, for example, available in the production system. It is then possible for the production step of manufacturing this 3-D shape to be associated with the production function of milling, for example. Additionally, the production planning device can then check, in the course of ascertainment of the production flowchart, whether the geometric prerequisites, such as the size of the product to be conditioned, are compatible with the applicable capabilities and constraints of the one or more milling machines that are present in the production system, for example. Quality criteria to be met or materials to be conditioned may also be further restrictions in this case for the selection of a possible production module for performing the conditioning step. In a comparable way, the production planning device can then ascertain one or more applicable production modules for each of the production steps, for example. This information can then be used by the production planning device to design an appropriate "production module layout plan" along which the relevant product, such as by virtue of appropriate transport modules or the like, takes a path through the production system until the intermediate product or end product is created.

The production flowchart can comprise, by way of example, a collection of production modules that have the production functions necessary for manufacturing the intermediate product or end product. The production flowchart can also comprise the production module proximate to a particular product location or may have just this proximate production module. Additionally, the production flowchart can comprise a series of production modules through which a product can pass in succession for the manufacture of the intermediate product or end product. Additionally, the production flowchart may also contain provision for alternative orders for the manufacture of the intermediate product or end product. In this case, a respective production module may have the one or more production functions or production services to be respectively performed on the production module, applicable production times or production periods, scheduling, applicable production parameters (e.g., CAD data, temperature details or temperature profiles, pressure patterns, or press molds) associated with it. In this case, an order of production modules may also comprise one or more production modules repeatedly, such as if a product repeatedly uses the same production module for the manufacture of the intermediate product or end product.

The production flowchart can comprise, by way of example, all production modules that are intended to, able to or have to be used to manufacture the intermediate product or end product. In this case, one or more production modules can also be used repeatedly. Additionally, the production flowchart can comprise an order and possibly one or more alternative orders of production modules that are intended to, able to, have to be or that are passed through for the manufacture of the intermediate product or end product.

In this case, there may be provision for the production planning system to additionally have access to a term transfer module, wherein the term transfer module is configured to associate elements of the piece of production information regarding the manufacture of the intermediate product or end product and elements of the piece of self-description information of the production modules.

Such a term transfer module inside a production planning system additionally simplifies the configuration and/or operation of an applicable production system, because the collation of production steps to be implemented with available production functions is a simpler possibility using such a term transfer module, in particular is at least semi-automatable or is automatable.

The term transfer module may in this case be a portion or sub-segment of the production planning system or may be formed and configured as a separate unit, for example.

In this case, the association of elements of the piece of production information regarding the manufacture of the intermediate product or end product and elements of the piece of self-description information may, by way of example, be formed and configured such that one, multiple or all production steps within the piece of production information respectively have associated with them one or more production functions or production services available in production modules of the production system. By way of example, the association can comprise a production step of the piece of production information having one or more production functions associated with it that are required, possible or necessary for performing this production step.

Using such a term transfer module, the production planning device can analyse a first production step of the piece of production information, for example, can ascertain the one or more pieces of production information necessary for this step and can then continue the analysis with the next production step. When this has then been done for all production steps of the piece of production information, the production planning system can then be used, for example by virtue of appropriate juxtaposition of the necessary functionalities and possible transport paths between production modules, to create a production flowchart in accordance with the present invention.

Additionally, there may be provision for the term transfer module to comprise a database that comprises elements of the piece of production information regarding the manufacture of the intermediate product or end product and elements of the piece of self-description information of the production modules, where each of these elements has associated elements of the respective other category, association information and/or other elements from the elements.

Such a database, which may be configured as a NoSQL database or nonrelational database in accordance with the present invention, for example, allows the creation of a type of "dictionary", for example, that "translates" the terms of the piece of production information by associating general umbrella terms or categories therewith, for example. Additionally, this information may also have associated applicable terms regarding functionalities of production modules or comparable manufacturing terms. In the same way, terms of the self-description information can have general umbrella terms, categories or classifications associated with them, for example, or single terms that correspond to production steps. Additionally, terms of the self-description information may also have directly or indirectly associated terms from the realm of the production information, and/or terms from the realm of the production may also directly or indirectly have associated terms of the self-description information.

In this way, it is possible, by way of example, to take a particular production step term as a starting point for examining the category to which the production step belongs or the umbrella terms to which this production step belongs. It is then possible to look, e.g., further for production functions that are likewise associated with these or similar categories or umbrella terms. This can possibly also require a longer combinational string of terms and associations via different intermediate categories or intermediate terms.

Alternatively, certain production steps may also have one or more directly or indirectly associated production functions, for example. In this case, longer or more complex logical sequences of terms may possibly also be necessary to arrive at a useful association between a production step and production functionalities of the production system. In this regard, the embodiment of the database or databases as a NoSQL database or nonrelational database is particularly suitable on account of the possibility of comparatively simple production of combinational logic strings.

In this case, association information may be, by way of example, related terms, superordinate terms, classifications and/or categories that may be associated with the respective elements. By way of example, the database may be formed as what is known as an "ontology", or may be a representation of such an "ontology".

It is also an object of the invention to provide a production control device for setting up and/or controlling manufacture of an intermediate product or end product using a production system according to the present invention, where the production control device is configured to store a production flowchart for a product to be conditioned, where the production flowchart comprises a piece of information about an order of production modules of the production system through which a product is intended to, is able to, has to or does pass for the manufacture of the intermediate product or end product. In this case, the production control device is configured to communicate with at least one selection of production modules of the order of production modules. Additionally, the production control device is configured to ascertain a timing with which the conditioning of the products by the production modules or the selection of production modules occurs.

The storable or stored production flowchart and the communication options in the individual production modules allow the production control device, through the ascertainment of the timing with which the products are conditioned by the production modules, to further simplify the configuration and/or operation of an applicable production system. As such, by way of example, appropriate sequencing for a timing of product conditioning can be performed semi-automatically or fully automatically, with reduced effort by a user.

In this case, the production control device may comprise a software application having applicable hardware for executing the software application. Here, the hardware can also be used or may be usable by further software applications, modules, operating systems or the like, for example. By way of example, the production control device may be part of a data processing device according to the present invention that is associated with a product. Additionally, the production control device may be part of an, by way of example, external computer, of a production module or of one, multiple or all production modules of the production system or may be comprised by such devices.

Additionally, there may be provision for the production control device to be configured to store the production flowchart for the product to be conditioned, or for the production flowchart for the product to be conditioned to be stored in the production control device.

The production control device may also be configured to receive the production flowchart from an external device, particularly may have appropriate communication means that can be used or are used to effect such reception. External data processing devices of this kind may be, by way of example, a data processing device associated with a product or situated directly on the product, an external computer, one or more production modules or what are known as cyber-physical production modules and/or an external planning system (e.g., an MES or an IRP system). Additionally, the production control device may also be configured to perform an appropriate communication with the components.

The production flowchart can comprise, by way of example, an organised order of production modules and, e.g., also further alternative orders of production modules. In this case, by way of example, there may also be provision for a production module to be cited repeatedly within the order of production modules, such as if this production module is used for different production steps.

In this case, the order of production modules does not have to be an uninterrupted order. This means, e.g., that although the order of production modules can prescribe a sequence of production modules, it is entirely possible for there still to be further steps provided between the individual production module later steps. As such, although an order of production modules may be indicated in the production flowchart, for example, this is without providing corresponding transport steps or corresponding logistics. Additionally, the production flowchart may also be configured such that the order of production modules comprises a successive string of adjoining production modules.

The communication capability of the production control device with the production modules may be configured, by way of example, such that this communication renders the self-description information of the production modules, or portions thereof, and/or planning information about work processes of the production control device that are planned for the production modules, for example, accessible.

In this way, the production control device can ascertain the current state (e.g., fully active, restricted activity, stop, or maintenance state) that the production module is in currently or in future (e.g., via appropriate scheduling). In this way, the production control device can, e.g., ascertain when the production module will already be busy in future, and what periods of time would currently still be available for a product to be conditioned, for example.

During the ascertainment of the timing with which the products are conditioned, the production control device can then "negotiate", for example with the individual production modules, appropriate time windows within which the respective production modules are, would be or could be available for performing particular production functions on a product to be conditioned as appropriate.

Using the production flowchart, the applicable states and availabilities of the production modules and the aforementioned negotiation about options for the performance of production functions by the production modules, it is then possible for an appropriate schedule to be created, such as within the context of the ascertainment of the temporal profile with which the products are conditioned by the production modules. The schedule then comprises, e.g., information about when the individual production steps obtained from the production flowchart can be effected or are effected by which production module. In this way, appropriate time sequencing can then be effected, possibly with applicable alternative plans.

The ascertained timing can then be transmitted to the individual production modules, for example, with provision additionally being able to be made for the applicable production modules to update their respective internal planning information in accordance with a time sequence transmitted for a new product. Additionally, there may also be provision for the production control device to transmit to the respective production modules only that piece of information from the time sequencing that relates to the respective production module. In this case, there may be provision for the production modules to also update their internal scheduling in accordance with the freshly transmitted information.

For the ascertainment of a timing, there may be provision, for example with reference to the negotiation of the performance of particular production functions on a particular product, for the ascertainment of the timing of the conditioning by the production modules to involve an applicable conditioning time proposal being sent from the production control device to the relevant production module, and for a confirmation message to be used by the production module of the production control device to make an applicable setting or provide "consent" by the production module to the proposal made. A negotiation agreement mechanism of this kind simplifies ascertainment of the timing of the conditioning of products by the production modules, because appropriate setting means that the timing can be planned or is plannable more certainly and more reliably.

It is a further object of the invention to provide a production module that comprises a production planning device in accordance with the present invention and/or a production control device in accordance with the present invention.

Additionally, there may be provision for a production system in accordance with the present invention to comprise at least one production planning device in accordance with the present invention and/or at least one production control device in accordance with the present invention.

In this way, the design of an applicable production system having such production modules can be simplified further by virtue of means already being able to be provided that can be provided by applicable production planning, both as far as a sequence of production steps performed by individual production modules and applicable scheduling are concerned, in the production system, or production module, itself and as such can be semi-automated or fully automated.

By way of example, a production module or production system of this kind can, following configuration of an applicable communication among various production modules and of an applicable transmission of a piece of production information relating to a particular product, allow comparatively independent ascertainment of a product conditioning (from the planning of conditioning of the product by the coupled production modules to practical implementation of the production).

It is an additional object of the invention to provide a method for planning manufacture of an intermediate product or end product using a production system according to the present invention, where a piece of production information is available that comprises production steps required for manufacturing the intermediate product or end product, a production planning device for planning the manufacture of the intermediate product or end product is provided, and the production planning device has access to the piece of self-description information of the production modules of the production system.

In accordance with the invention, the method comprises transmitting the piece of production information regarding the manufacture of the intermediate product or end product to the production planning device, transmitting at least portions of the piece of self-description information of at least a selection of production modules of the production system to the production planning device, ascertaining and storing a production flowchart for a product to be conditioned, where the production flowchart comprises a piece of information about an order of production modules of the production system through which a product is intended to, able to, has to or does pass for the manufacture of the intermediate product or end product.

As a result of the capability of the transmitted production information and the individual pieces of self-description information from at least individual production modules being available for the ascertainment of the production flowchart, it is possible, as already explained above, to simplify, semi-automate or fully automate applicable production planning using such a production system. In this way, the configuration and/or control of an applicable production system can be simplified.

In this case, there is provision for the intermediate product or end product to be manufactured using a production system in accordance with the present invention. By way of example, the method for planning the manufacture can likewise be performed within the production system, such as by a computer module provided therein or one or more of the production modules contained. Additionally, the method can also be performed inside an external computer device.

By way of example, the piece of production information may be present or stored in an external computer unit, an applicable product planning system (e.g. an MES or an ERP system), a data processing unit associated with a product and/or in one or more of the production modules. The piece of production information can also be transmitted to the production planning device inside an apparatus, for example, if both the piece of production information and the production planning device are present or provided inside the same apparatus.

The piece of production information may also be configured as explained in more detail at another juncture in the present invention, for example. It may particularly comprise or have all production steps required for manufacturing the intermediate product or end product or may comprise only a selection of these production steps. In the latter case, there may be provision for single instances of the total production steps required for manufacturing the intermediate product or end product to also be performed outside the production system or in another way, for example.

The production steps may also be established as explained in more detail at another juncture in the present invention, for example. They may particularly be any kind of conditioning, treatment, conversion, or reshaping for a product, material, substance, an assembly or the like. Examples of production steps may be, by way of example, milling, drilling, painting, pressing, heating, cooling, transporting, melting, printing, or painting.

The production planning device may be configured in accordance with the present invention, for example. In particular, it may comprise a software application having associated hardware for executing the application, for example. In this case, the hardware can also be used by further software applications, for example. The production planning device may be implemented inside a computer, a controller, or a production module, for example.

The production planning device can use applicable communication means, for example, to access the piece of self-description information stored inside a production module and to request the information completely or in part from the production module and then receive it by transmission, for example. Additionally, the piece of self-description information of the individual production modules may also be stored in a separate device, e.g., an applicable production planning system or other computers or modules, and can be transmitted therefrom to the production planning device using applicable communication means.

The piece of self-description information transmitted to the production planning device can respectively comprise particularly those portions of the piece of self-description information that relate to one or more production functions of the respective production module. This can comprise applicable identification information for particular production functions, information about work areas and quality criteria of the production module or the like, for example.

The selection of production modules of the production system that transmit at least portions of their piece of self-description information to the production planning device may be all production modules of the production system, some production modules of the system or just one production module of the production system, for example. In particular, the selection of production modules can comprise those production modules or can consist of those production modules that are provided with or have access to applicable communication means and applicable self-description information.

The production flowchart can be stored inside the production planning device, inside one or more production modules or a separate computer, for example. Storage by the production planning device will be provided for on a regular basis, but does not absolutely have to occur. Alternatively, the ascertainment of the production flowchart can involve the latter being transmitted directly to another unit more or less immediately for the ascertainment and being stored there first.

The production flowchart may in this case be configured as already explained in more detail at another juncture in the present invention, for example. The production flowchart can comprise, e.g., a module sequence, respective production functions or production services to be performed, scheduling, or production parameters (e.g., CAD data, temperature profiles, or pressure patterns).

The piece of information about an order of production modules may also be configured as already explained in more detail at another juncture in the present invention. In particular, the order of production modules may be a continuous sequence of adjoining production modules. Additionally, however, a basic sequence of production modules may also be provided for the production flowchart, the production flowchart still containing no or at least no complete information about logistics between the individual production modules. Additionally, the order of production modules may also contain a production module repeatedly.

Following the ascertainment of the production flowchart, or independently thereof, there may be provision for a timing to be ascertained according to which the conditioning of the products by the production modules, or by the selection of production modules, is effected.

In this case, the ascertainment of the timing according to which the conditioning of the products by the production modules is effected may be configured as explained in more detail above, for example as part of the explanation of the functionality of the production control device. In particular, the ascertainment of the timing according to which the conditioning of the products by the production modules is effected can comprise "negotiation" about available production capacities, production functionalities and/or production time windows with the individual production modules.

Additionally, the ascertainment can comprise, by way of example, what is known as a "resource allocation", via which particular production resources and/or production times are more or less "arranged" with the individual production modules as part of the ascertainment of the timing of the conditioning steps by the production modules. This can comprise transmission of an applicable information message about an applicable resource demand and be more or less confirmed or "acknowledged" by an applicable confirmation message from an applicable production module. The applicable resources, e.g., the reservation of a particular time period for the conditioning or treatment of a particular product, can then be stored and hence reserved, set and/or blocked, e.g., in the applicable production module, such as in an applicable planning table or planning database.

The ascertained timing can be stored in a production module, an external unit or a production planning system, for example. Additionally, the respective information relating to a particular module can also be transmitted to the respective module and stored therein. Such storage inside the modules can alternatively or additionally also occur as part of the "resource allocation" and/or acknowledgement of applicable resource requests, as explained by way of example above.

The production flowchart can additionally comprise information about one or more production functions to be performed on each of the respective production modules. This can comprise identifiers or information regarding the individual functionalities, and/or also applicable parameters regarding the production function (e.g., geometric parameters, functional parameters, or qualitative parameters), for example.

Additionally, there may be provision for the production planning system to have access to a term transfer module in accordance with the present invention for or before the ascertainment of the production flowchart or to access such a term transfer module for the ascertainment.

In this case, there may be provision, by way of example, e.g., a term regarding a particular production step to be transmitted from a piece of production information to the applicable term transfer module and for one or more terms associated therewith for the production functionalities of available production modules, for example, to be transmitted back from the term transfer module or vice versa.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below by way of example with reference to the accompanying figures, in which.

DETAILED DESCRIPTION OF THE EXEMPLARY EMBODIMENTS

Figure 1:
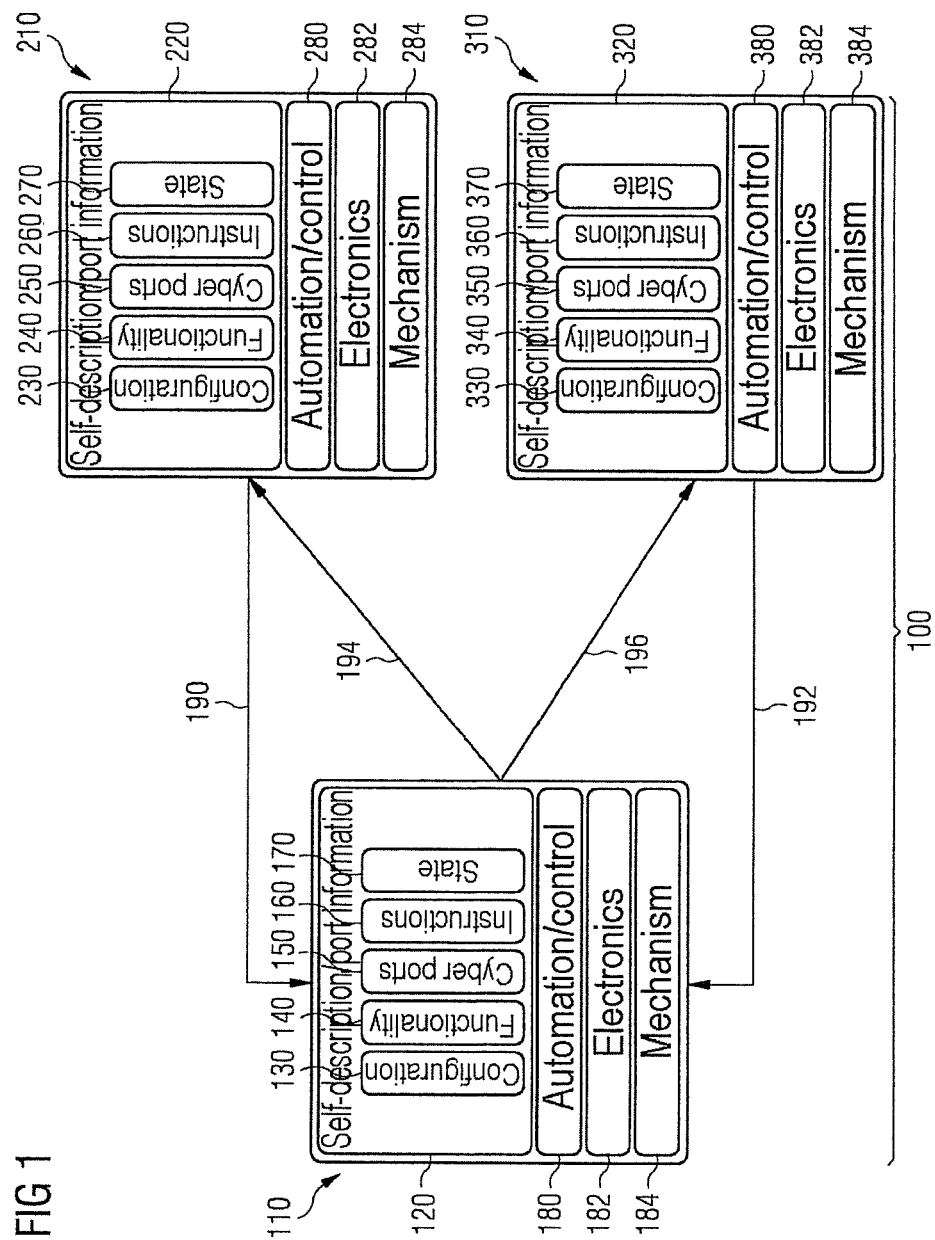
FIG. 1 shows an example of a structure of an exemplary production system constructed from production modules in accordance with the invention.

FIG. 1 shows a schematic layout of a production system 100 having a first production module 110, a second production module 210 and a third production module 310, which are depicted schematically as squares in FIG. 1.

For each of the modules 110, 210, 310, a configuration of the modules is depicted schematically. Here, the modules each comprise a memory area 120, 220, 320, where the memory area 120, 220, 320 of the respective modules 110, 210, 310 respectively stores port information 150, 250, 350 regarding what are known as "cyber-physical ports" that are present in the respective module. The port information 150, 250, 350 depicted in FIG. 1 is an example of port information in accordance with the present invention.

Additionally, the memory area 120, 220, 320 of the respective production modules comprises a respective piece of configuration information 130, 230, 330 regarding functional and also electronic, mechanical and communicative configurations and also properties of the respective module. Additionally, the memory area 120, 220, 320 of the respective modules comprises a functionality description 140, 240, 340 of the respective module, a description of available instructions 160, 260, 360 and also one or more pieces of state information 170, 270, 370 regarding the respective module 110, 210, 310. The configuration information 130, 230, 330, the functionality descriptions 140, 240, 340, the descriptions of available instructions 160, 260, 360 and state information 170, 270, 370 are each examples of self-description information in accordance with the present invention. The aforementioned self-description and port information will be explained further by way of example in connection with FIG. 2.

Additionally, each of the production modules 110, 210, 310 comprises an automation and/or control device 180, 280, 380 for automating or controlling and handling the various functionalities and services that the respective production module 110, 210, 310 provides. Additionally, each of the production modules 110, 210, 310 contains one or more electronic assemblies or electronic modules 182, 282, 382 that are required for and used for operating actuators, for example, and also other electronic, optical and other devices of the module 110, 210, 310. Also, each of the modules 110, 210, 310 comprises mechanical elements 184, 284, 384.

The arrows 190, 192, 194, 196 depicted in FIG. 1 depict an exemplary communication cycle in the event of changes in the first production module 110. In this regard, the second production module 210, for example, uses an applicable message 190 to register with the first production module 110 as a "subscriber", i.e., as a module connected to the first production module 110. This registration can be effected during the coupling or immediately after the coupling of the two modules or later, for example. In the same way, the third production module 310 uses an applicable "subscriber" message 192 to register with the first production module 110. In the event of changes in the first production module, such as a change of state from a normal state to a stop state, which is then stored in the state information 170 of the first production module 110, the first production module 110 then sends an applicable change message 194 to the second production module 210 and also an applicable message 196 to the third production module 310. In this way, the second and third production modules 210, 310 are informed about the change of state in the first production module 110 and can take this into consideration for coordinating a production chain or joint conditioning or treatment of a product, for example.

A communication scheme of this kind can, in principle, be used to ensure that in the event of changes in one of the production modules 110, 210, 310, the production modules directly or indirectly connected thereto are each informed and can take this into consideration for the interaction within the production system 100. An applicable "subscription" process may then be set up, mutatis mutandis, in the same way from the first and third production modules 110, 310 to the second production module 210 and from the first and second production modules 110, 210 to the third production module, so that all three of the modules 110, 210, 310 depicted in FIG. 1 use such a mechanism to inform one another about changes as applicable in each case.

The production modules 110, 210, 310 can in this case be referred to as what are known as "cyber-physical modules" (CPM), or as what are known as "cyber-physical production modules" (CPPM), and are in the form of and configured as such modules. In this context, the production system 100 can also be referred to as what is known as a "cyber-physical system" (CPS), for example, and is configured in this manner.

Figure 2:
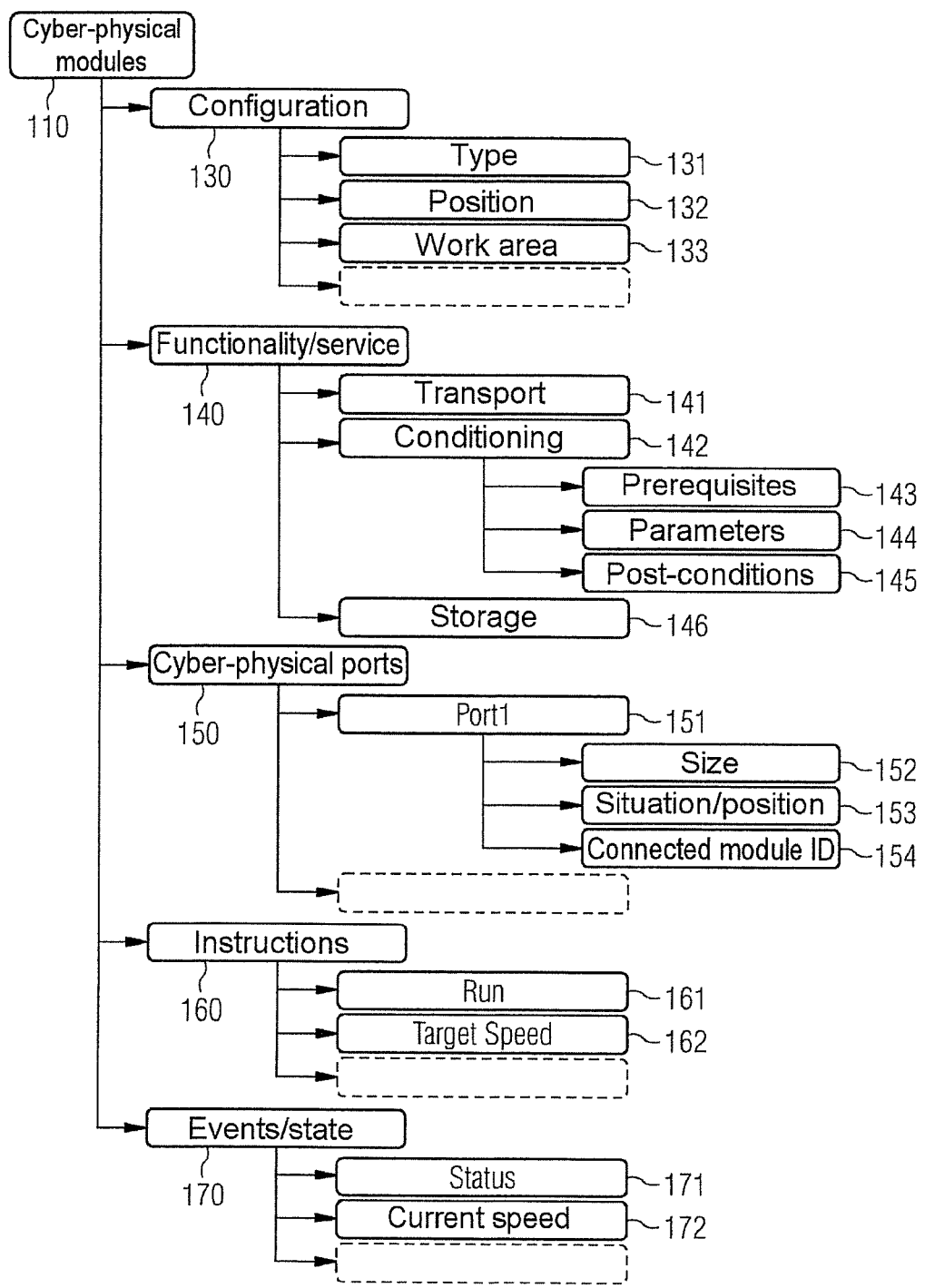
FIG. 2 shows a detailed example of a data structure of a production module in accordance with the invention.

FIG. 2 shows the example of a schematic design of the memory unit 120 depicted in FIG. 1 in the first production module 110. This self-description information and port information memory 120 comprises a piece of configuration information 130 that stores a module type 131, a geometric situation or arrangement 132 of the module or of functional elements of the module and also a work area 133 of the module 110, for example. Here, the "type" 131 can consist of an applicable identifier or one or more functional descriptors, for example, or comprise such information. The piece of information about the work area 133 can contain a description of a spatial area, for example, in which products may be present in the applicable production module 110 or within which these products can be moved. As such, by way of example, a work area of a transport or conveyor belt may be a volume area extending longitudinally along the transport or conveyor belt and in which the product can be moved via the transport or conveyor belt. In the case of a conditioning machine, the work area may be the volume area in which a conditioning element of the machine can influence a product located therein, for example. Applicable work areas can be ascertained for further functionalities within the context of the production functions described above.

Additionally, the memory area 120 of the first production module 110 comprises a piece of functionality and service information 140, this piece of information comprising further information pertaining to transport options 141 with the module, conditioning options 142 of the module or storage options 146 for racking or storing products or materials. By way of example, the conditioning information 142 can additionally comprise information pertaining to prerequisites for use of the applicable conditioning functions 143, applicable parameters that denote the conditioning functions in more detail 144 and/or post-conditions 145 that are characteristic of or necessary for further treatment of the product after conditioning.

Quite generally, a production module in accordance with the present invention can respectively also comprise multiple instances of the cited production functionalities, in which case a piece of information can be stored or is stored in an applicable memory device, for example, for each of the functionalities. As such, by way of example, a production module can have multiple transport functionalities, for example via one or more transport or conveyor belts or robot arms or a combination thereof, can have various conditioning functions and also can have various storage options.

The memory device 120 of the production module 110 additionally stores a piece of port information 150 about what is known as a "cyber-physical port" for a further production module. This "cyber-physical port" can comprise both information about a functional cooperation of coupled production modules and information about functionalities available in the modules coupled in this manner.

As such, the piece of port information 150 contains, by way of example, information about a first "cyber-physical port" 151 for an adjacent, coupled production module, such as the second production module 210 shown in FIG. 1. Here, the applicable piece of port information 151 contains, by way of example, a piece of information about a size of the interaction or transfer area 152 for the second production module, a situation or position of the transfer area 153 and an identifier 154 of the connected module 210. Additionally, by way of example, a piece of information about a functionality of the second production module and information about functionalities of further production modules connected to the second production module 210 may be stored in the applicable piece of port information 151. If a further direct connection were to exist from the first production module 110 to a further production module, such as the third production module 310 shown in FIG. 1, then an applicable piece of port information would also be stored for this applicable "cyber-physical port" for the third production module 310 in the general piece of port information 150.

Additionally, the memory area 120 of the first production module 110 contains a piece of information 160 about instructions or commands usable in the production module for the control thereof. As such, this instruction memory 160 has a record of, by way of example, information pertaining to a run instruction 161 or pertaining to a target speed instruction 162, which information defines these instructions with applicable usable parameters, where the instructions are readable by a user of the system for the purpose of setting up a control for the production module 110.

The event/state information area 170 in the memory device 120 of the first production module 110 stores, by way of example, information about the current status of the production module 171 and, by way of example, about the current speed of a motor of the module 172.

All of the information shown in FIG. 2 that is stored in the first production module 110 allows cooperation of multiple such production modules to be organised and a joint production cycle for such coupled production modules to be obtained even with relatively little action from a user, or even without any action from a user. The cited information allows a further module coupled to such a production module to identify both information about functionalities using the geometry and information about the state and the actuation and control options for a module and also the coupling options for coupling to the module and to take this into consideration for a semi-automated or automated planning process, for example.

Figure 3:
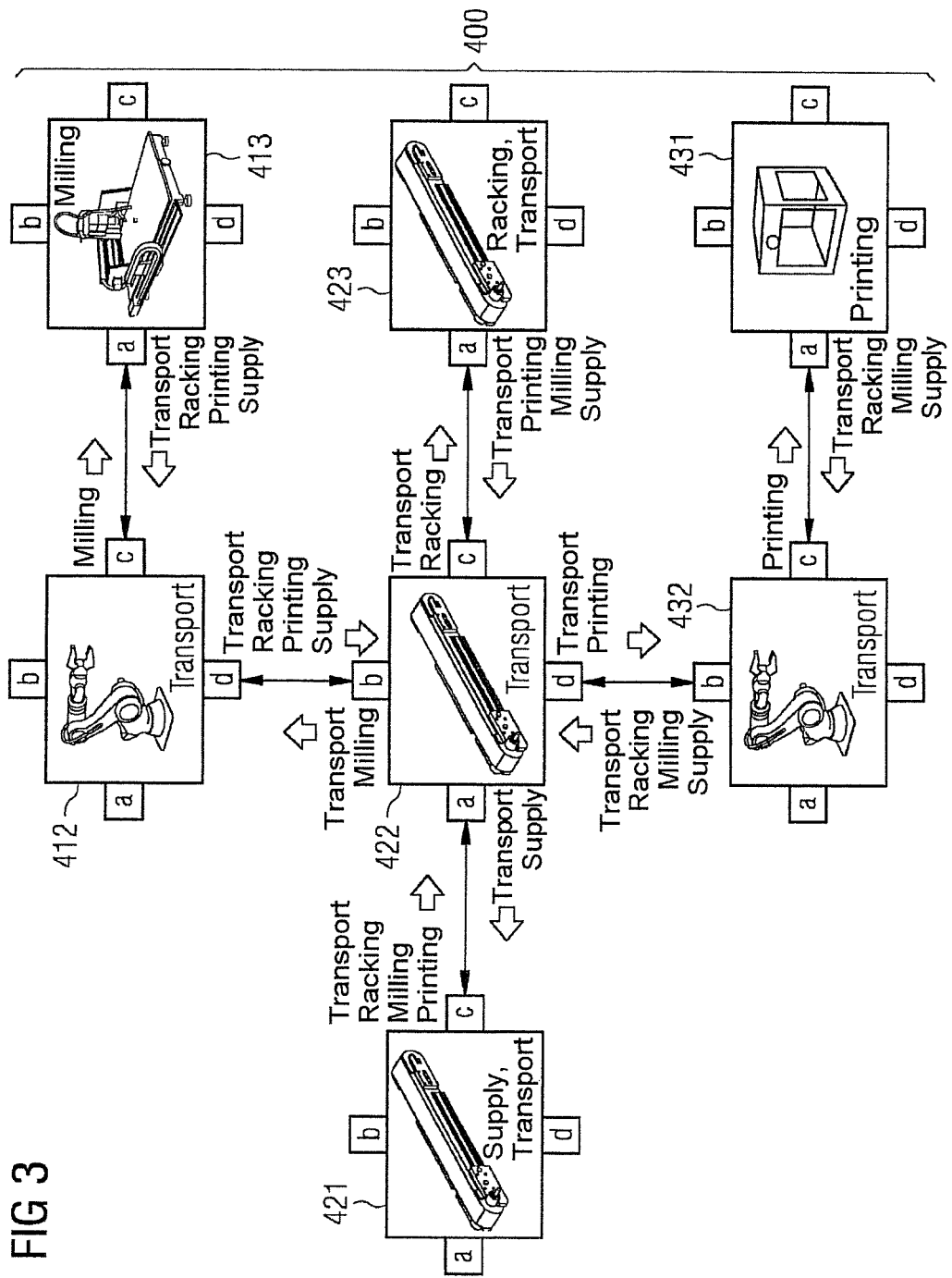
FIG. 3 shows a schematic depiction of a further exemplary production system in accordance with the invention.

FIG. 3 depicts a production system 400 in a functional depiction. Here, the production system 400 comprises a 3D printer 431, two robots 412, 432 and a CNC machine 413 (CNC: Computerized Numerical Control). Additionally, the production system comprises a supply and transport unit 421 for an initial product, a transport or conveyor belt 422 for a product being conditioned and a transport and storage unit 423 for an intermediate product or end product manufactured by the production system 400.

The depiction of the individual production modules in FIG. 3 is provided symbolically, with four "cyber-physical ports" a, b, c, d being depicted for each of the production modules as appended, small squares that symbolise a possible or existing "cyber-physical port".

As such, the conveyor belt 422 has four existing "cyber-physical ports" 422/*a*, 422/*b*, 422/*c*, 422/*d*, for example. In this case, the "cyber-physical port" 422/*a* for the supply/transport module 421 symbolises the "cyber-physical port" for this module. The information stored with reference to this "cyber-physical port" 422/*a* also comprises all of the functionalities that are attainable via this "cyber-physical port". These attainable functionalities are written as text beside the respective square symbol of the "cyber-physical port" in FIG. 3. As such, the "cyber-physical port" 422/*a* contains, inter alia, the information that via this port, i.e., this connection, for the supply/transport module, the functionalities: "transport" and "supply" that can be performed by the applicable module 421 are attainable. Via the port 422/*b* of the transport module 422 for the robot 412, the "transport" and "milling" functionalities are available, for example, these then being stored in the applicable piece of port information 422/*b*. Here, the "transport" functionality is performed by the robot 412, while the "milling" functionality is performed by the CNC milling machine 413 connected to the robot 412.

Via the port 421/*c* of the supply/transport module 421, in this way all functionalities (other than those inherent) of the production system 400, as depicted in FIG. 3, are available, i.e., the "transport", "racking", "milling" and "printing" functionalities in the widest variety of ways, for example.

In this way, for a product located in a particular module, and known next required work steps, a production cycle for further production of the product can be determined as required by analysing the port information of the respective module in each case.

The organisation of the individual pieces of function information stored in the ports about the connected modules can be achieved via an applicable information distribution step, for example. A change forwarding mechanism, as explained in connection with FIG. 1, for example, can then be used to keep the respective information up to date.

Figure 4:
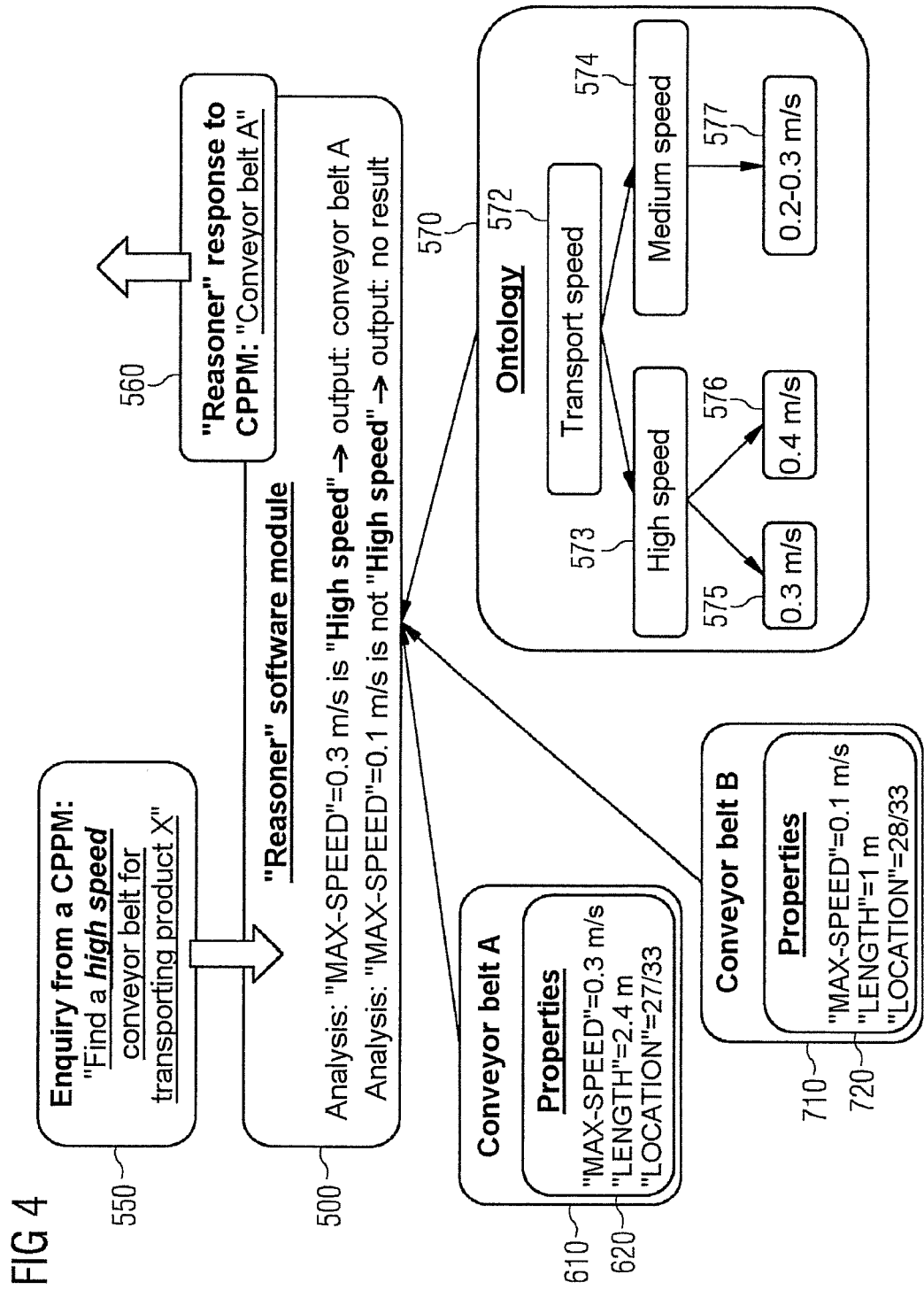
FIG. 4 shows an example of the cycle of a term association during production planning in accordance with the invention.

FIG. 4 shows the functionality of what is known as a "reasoner" for collating demands from a production plan for a product and properties of individual production modules, e.g., what are known as "cyber-physical production modules" (CPPM). Such a "reasoner" is an example of a term transfer module in accordance with the present invention.

In the example depicted in FIG. 4, a production instruction or production planning for manufacturing a product is present within a cyber-physical production module (CPPM). This production thereby involves a "high speed" transport or conveyor belt being requested for transporting a particular product X. The CPPM sends a message 550 with an applicable enquiry to the reasoner 500.

To analyse the term "high speed", the reasoner 500 accesses an ontology database 570, which is stored as a database in a NoSQL format. Within the ontology, the term "transport speed" 572 has an assigned term "high speed" 573 and additionally also an assigned term "medium speed" 574. Additionally, the ontology 570 has the speed "0.3 m/s" 575 and additionally also the speed "0.4 m/s" 576 assigned to the term "high speed" 573. The term "medium speed" 574 has an assigned speed of "0.2-0.3 m/s" 577. Via a logical chain, the evaluation of the ontology database 570 leads from the term "transport speed" 572 to the "high speed" 573 and from there additionally to the speed 0.3 m/s 575 or 0.4 m/s 576.

A production system on which the figure is based comprises a first conveyor belt A 610 and a second conveyor belt B 710, with the first conveyor belt A 610 comprising a property database 620 and the conveyor belt B 710 likewise comprising a property database 720. These property databases 620, 720 are examples of self-description information in accordance with the present invention.

In a first analysis step, the "reasoner" 500 analyses the conveyor belt A 610 and establishes that the maximum speed provided by the conveyor belt A 610 is consistent with a "high speed", and outputs the name "conveyor belt A" as the result.

In a further analysis, the conveyor belt B 710 is analysed in the same way, where it follows from the information from the ontology database 570 that the maximum speed of the conveyor belt B 710 is not a "high speed" and thus the analysis produces no results. As overall information for the analysis, the reasoner 500 then sends a response message 560 with the response "conveyor belt A" back to the enquiring CPPM. An applicable planning device inside the CPPM can then use this information to plan the applicable transport step via conveyor belt A.

Figure 5:
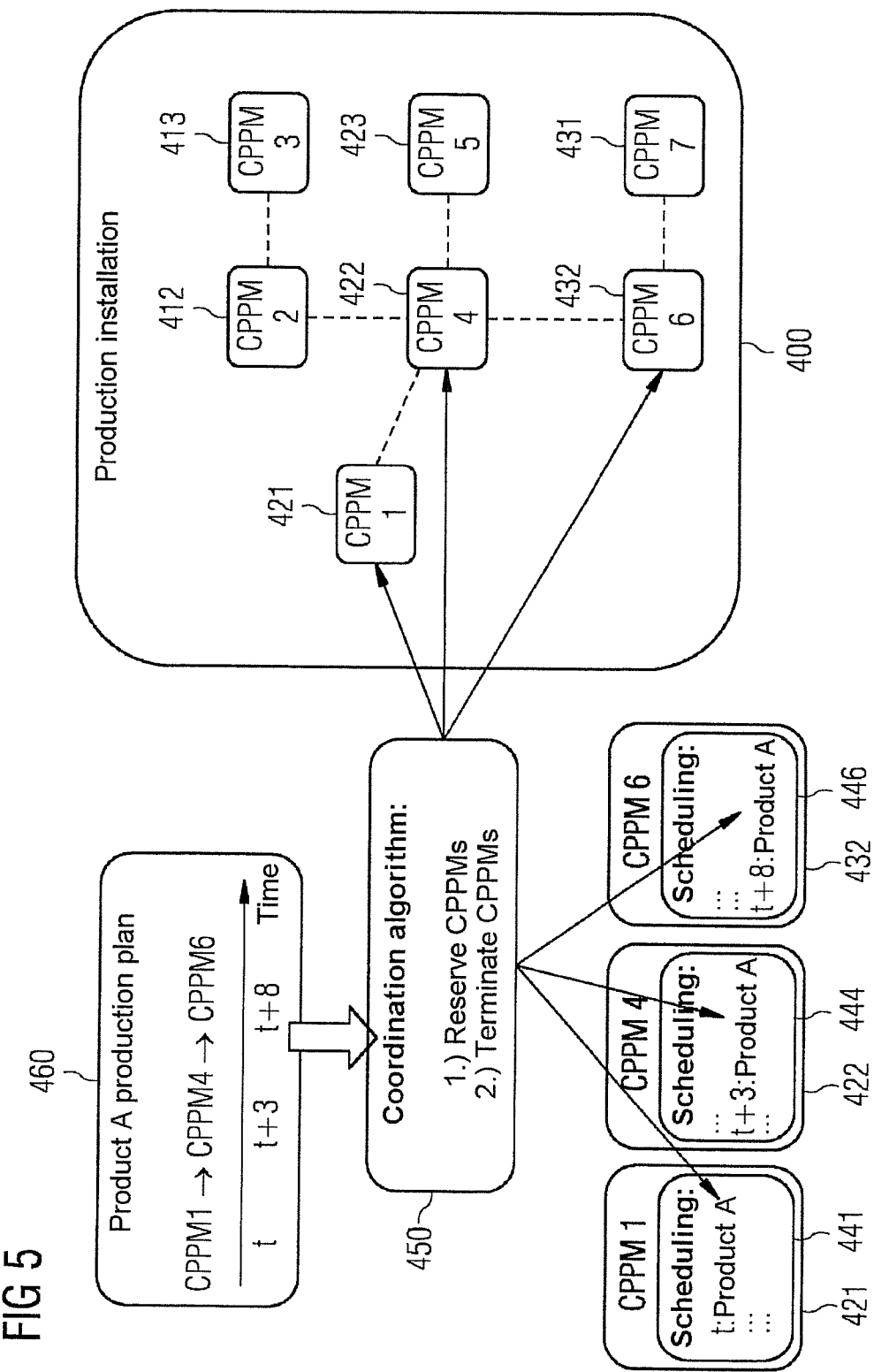
FIG. 5 shows an example of the cycle of scheduling for production.

FIG. 5 shows an example of a coordination algorithm 450 for production cycle scheduling within the production system 400 already explained in connection with FIG. 3. Here, the production modules 421, 412, 413, 422, 423, 432, 431 of the production system 400 and the coupling of the production modules are consistent with those explained for FIG. 3.

For the production system 400, a production plan 460 for a product A is available that reveals an order of conditioning first by CPPM1 (supply/transport or conveyor belt) 421, subsequently by CPPM4 (transport or conveyor belt) 422, and further subsequently CPPM6 (robot) 432. The coordination algorithm 450, which is an example of a production control device or possibly also a production planning device in accordance with the present invention, then initially asks CPPM1 421 for free periods for conditioning product A and receives therefrom the response that treatment of product A would be possible at a time t. The coordination algorithm 450 recognises that this is possible in the production cycle and, in a second communication step, reserves a time t for conditioning of the product A with CPPM1 421 via an applicable reservation message. This is depicted in FIG. 5 as arrows from the coordination algorithm 450 to CPPM1.

CPPM1 421 records this in a dedicated scheduling file 441 as applicable, so that on the next enquiry the time or period around t is no longer available as a free conditioning time or period and CPPM1 also outputs an applicable piece of information in the event of a corresponding enquiry. To more clearly depict the scheduling file 441 of CPPM1 421 and also corresponding scheduling files 444, 446 of the other two affected modules (CPPM4 422 and CPPM6 446), these modules are depicted in enlarged form again in the bottom left-hand region of FIG. 5.

Subsequently, the coordination algorithm 450 asks CPPM4 422 for the periods for conditioning product A that are available therein. In this context, CPPM4 indicates various possible times, for example, including, inter alia, a time t+3 that proves to be the most suitable according to production plan 460 by virtue of the coordination algorithm 450.

An applicable message (again symbolised by applicable arrows in FIG. 5) is then used to terminate CPPM4 422 as applicable and then to then set the treatment of product A at the time t+3 in a scheduling database 444 of CPPM4 422.

According to this course of action, the time t+8 is then additionally set for the conditioning of product A by CPPM6 432 and is recorded in an applicable scheduling database 446 of CPPM6 432.

In a further step, the respective times for the conditioning are also added in the production plan 460 for product A, as is entered in FIG. 5 in connection with production plan 460 for product A. In this way, the production plan 460 has been developed further to produce a production schedule 460.

Figure 6:
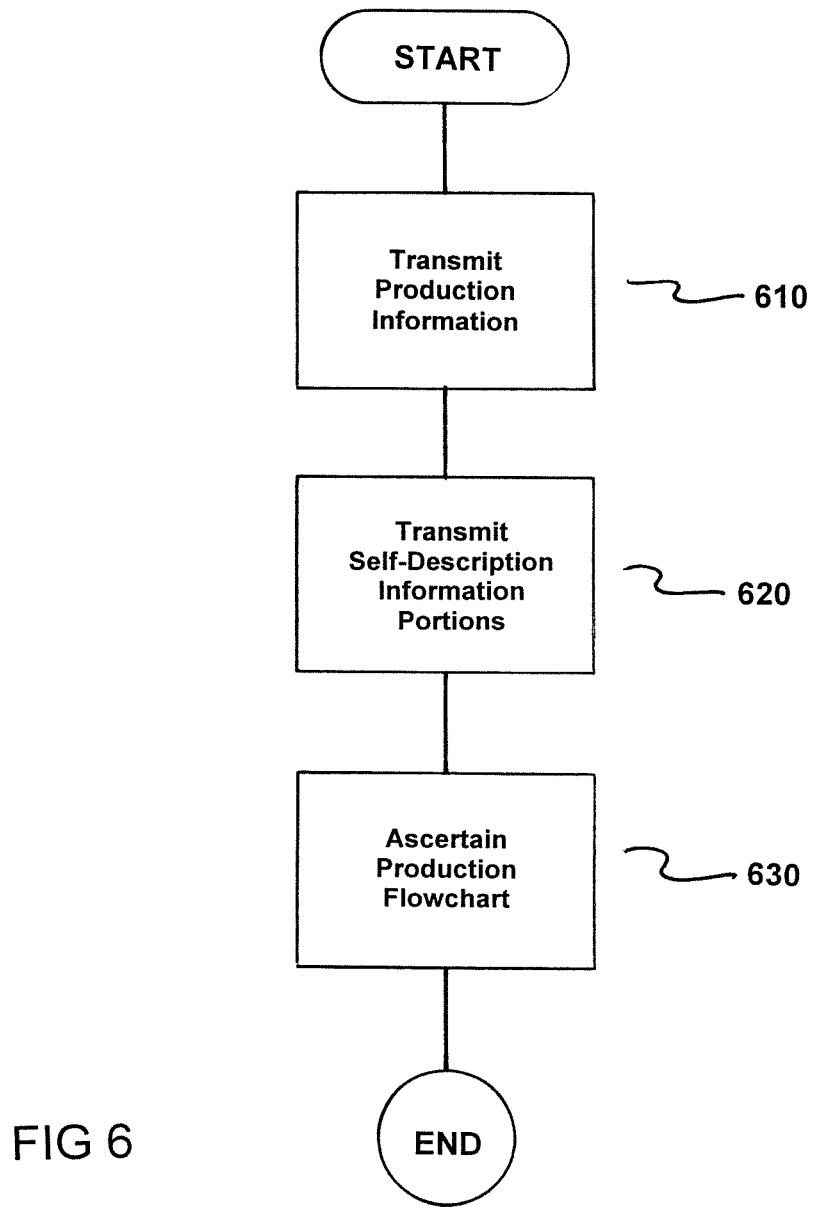
FIG. 6 is a flowchart of the method in accordance with the invention.

FIG. 6 is a flowchart of the method for planning the manufacture of an intermediate product or end product via a production system (100, 400), where a piece of production information is available which comprises production steps required for manufacturing the intermediate product or end product, a production planning device for planning the manufacture of the intermediate product or end product is provided, and the production planning device has access to the self-description information 130, 140, 160, 170, 230, 240, 260, 270, 330, 340, 360, 370, 620, 720 of production modules 110, 210, 310, 412, 413, 421, 422, 423, 431, 432, 610, 710 of the production system 100, 400. The method comprises transmitting the piece of production information regarding the manufacture of the intermediate product or end product to the production planning device, as indicated in step 610.

Next, at least portions of the self-description information of a selection of production modules of the production system are transmitted to the production planning device, as indicated in step 620.

A production flowchart 460 for a product to be conditioned is now ascertain, as indicated in step 630. Here, the production flowchart comprises a piece of information about an order of production modules of the production system through which a product is intended to or does pass for the manufacture of the intermediate product or end product.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A production module for performing a production function on a product, the production module being configured to couple to a second production module which is configured to perform a second production function on the product, the production module comprising:
a memory device which stores a piece of self-description information regarding properties of the production module comprising a piece of port information regarding the coupling to the second production module;
wherein the production module is configured to transmit the piece of self-description information or portions of the piece of self-description information to a further device; and
wherein the piece of self-description information is stored or storable as a NoSQL database or a non-relational database.

2. The production module as claimed in claim 1, wherein the piece of self-description information comprises:
at least one of:
(i) a piece of service information regarding the production function,
(ii) a piece of configuration information regarding at least one of (i) a situation and (ii) an embodiment of the production module,
(iii) a piece of capability information regarding available functions and services of the production module, said piece of capability information comprising a piece of information about the production function,
(iv) a piece of instruction information regarding instructions executable by the production module and adjustable parameters, and
(v) a piece of state information regarding a work state of the production module.

3. The production module as claimed in claim 2, wherein the second production module couplable or coupled to the production module comprises a second piece of self-description information regarding properties of the second production module; and
wherein the production module configured to transmit the piece of self-description information or portions of the piece of self-description information to the second production module and to receive the second piece of self-description information or portions of the second piece of self-description information from the second production module.

4. The production module as claimed in claim 1, wherein the second production module couplable or coupled to the production module comprises a second piece of self-description information regarding properties of the second production module; and
wherein the production module configured to transmit the piece of self-description information or portions of the piece of self-description information to the second production module and to receive the second piece of self-description information or portions of the second piece of self-description information from the second production module.

5. The production module as claimed in claim 1, wherein the piece of port information regarding the coupling to the second production module comprises information regarding properties of further production modules at least one of (i) directly and (ii) indirectly connected to the second production module.

6. The production module as claimed in claim 5, wherein the information regarding properties of further production modules comprises production functions of the production modules at least one of (i) directly and (ii) indirectly connected to the second production module.

7. The production module as claimed in claim 1, wherein the production module is configured to communicate with a product data processing device associated with a product to be conditioned and to receive a piece of production information regarding manufacture of an intermediate product or end product.

8. The production module as claimed in claim 1, wherein the production module is configured to store a piece of module planning information and is additionally configured to output a piece of information regarding the piece of module planning information.

9. The production module as claimed in claim 1, wherein the piece of self-description information is stored or storable as at least one of (i) an OWL or RDF database and (ii) a database using SPARQL as a query language.

10. The production module as claimed in claim 1, wherein the production module additionally includes a production planning device.

11. A production system for manufacturing an intermediate product or end product, comprising:
a plurality of production modules coupled among one another, each of the plurality of production modules including a memory device which stores a piece of self-description information regarding properties of a production module comprising a piece of port information regarding the coupling to a second production module of the plurality of production modules, each of the plurality of production modules being configured to transmit the piece of self-description information or portions of the piece of self-description information to a further device, the piece of self-description information being stored or storable as a NoSQL database or a nonrelational database.

12. A production planning device for planning manufacture of an intermediate product or end product via a production system as claimed in claim 11,
wherein the production planning device is configured to store a piece of production information, the piece of production information comprising production steps required for manufacturing the intermediate product or end product;
wherein the production planning device is configured to at least one of (i) receive and (ii) store at least portions of the self-description information of a selection of production modules of the production system; and
wherein the production planning device is configured to ascertain a production flowchart for a product to be conditioned, the production flowchart comprising a piece of information about an order of production modules of the production system through which a product is intended to or does pass for the manufacture of the intermediate product or end product.

13. The production planning device as claimed in claim 12, wherein the production planning system additionally has access to a term transfer module, the term transfer module being configured to associate elements of the piece of production information regarding the manufacture of the intermediate product or end product and elements of the piece of self-description information of the production modules.

14. The production planning device as claimed in claim 13, wherein the term transfer module comprises a database comprising elements of the piece of production information regarding the manufacture of the intermediate product or end product and elements of the piece of self-description information of the production modules; wherein each of these elements having at least one of (i) associated association information and (ii) other elements from the elements.

15. A production control device for at least one of (i) configuring and (ii) controlling manufacture of an intermediate product or end product via the production system as claimed in claim 11;
wherein the production control device is configure to store a production flowchart for a product to be conditioned, the production flowchart comprising a piece of information about an order of production modules of the production system through which a product is intended to or does pass for the manufacture of the intermediate product or end product; and
wherein the production control device is further configured to communicate with at least one selection of production modules in orders of production modules, and is additionally configured to ascertain a timing with which the conditioning of the products by the production modules or the selection of production modules occurs.

16. The production system as claimed in claim 11, wherein the production system contains at least one production planning device.

17. A production system for manufacturing an intermediate product or end product, comprising:
a plurality of production modules, each of the plurality of production modules including a memory device which stores a piece of self-description information regarding properties of a production module comprising a piece of port information regarding a coupling to a second production module of the plurality of production modules; and
a term transfer module configured to associate elements of a piece of production information regarding the manufacture of the intermediate product or end product and elements of the self-description information of the production modules
wherein each of the plurality of production modules is configured to couple to at least one respective further production module of the plurality of production modules;
wherein a respective memory device in each of the production modules stores a piece of self-description information regarding properties of the relevant production module; and
wherein each of the production modules is configured to transmit the respective piece of self-description information or portions of the respective piece of self-description information to a further device; and
wherein at least some of the plurality of production modules are coupled among one another.

18. A production planning device for planning manufacture of an intermediate product or end product via a production system as claimed in claim 17,
wherein the production planning device is configured to store a piece of production information, the piece of production information comprising production steps required for manufacturing the intermediate product or end product;
wherein the production planning device is configured to at least one of (i) receive and (ii) store at least portions of the self-description information of a selection of production modules of the production system; and
wherein the production planning device is configured to ascertain a production flowchart for a product to be conditioned, the production flowchart comprising a piece of information about an order of production modules of the production system through which a product is intended to or does pass for the manufacture of the intermediate product or end product.

19. A production control device for at least one of (i) configuring and (ii) controlling manufacture of an intermediate product or end product via the production system as claimed in claim 17;
wherein the production control device is configure to store a production flowchart for a product to be conditioned, the production flowchart comprising a piece of information about an order of production modules of the production system through which a product is intended to or does pass for the manufacture of the intermediate product or end product; and
wherein the production control device is further configured to communicate with at least one selection of production modules in orders of production modules, and is additionally configured to ascertain a timing with which the conditioning of the products by the production modules or the selection of production modules occurs.

20. The production system as claimed in claim 17, wherein the production system contains at least one production planning device as.

21. A method for planning manufacture of an intermediate product or end product via a production system, a piece of production information being available which comprises production steps required for manufacturing the intermediate product or end product, a production planning device for planning the manufacture of the intermediate product or end product being provided, and the production planning device having access to self-description information of production modules of the production system, said self-description information comprising a piece of port information regarding a coupling to a second production module of a selection of production modules of the production system, the method comprising:
transmitting the piece of production information regarding the manufacture of the intermediate product or end product to the production planning device;
transmitting at least portions of the self-description information comprising the piece of port information regarding the coupling to the second production module of the selection of production modules of the production system to the production planning device; and
ascertaining a production flowchart for a product to be conditioned, the production flowchart comprising a piece of information about an order of production modules of the production system through which a product is intended to or does pass for the manufacture of the intermediate product or end product.

22. The method as claimed in claim 21, wherein during or after the ascertainment of the production flowchart a timing is additionally ascertained according to which the conditioning of the products by the production modules, or the selection of production modules, occurs.

23. The method as claimed in claim 22, wherein the ascertained production flowchart additionally comprises information about one or more production functions to be performed on each of the respective production modules.

24. The method as claimed in claim 21, wherein the ascertained production flowchart additionally comprises information about one or more production functions to be performed on each of the respective production modules.

25. The method as claimed in claim 21, wherein the production planning system accesses a term transfer module before or during the ascertainment of the production flowchart.

\* \* \* \* \*